H. J. MITCHELL.
BEARING.
APPLICATION FILED APR. 8, 1910.
1,030,912.
Patented July 2, 1912.
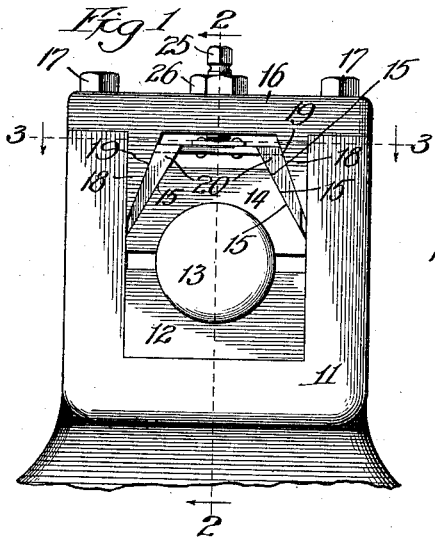
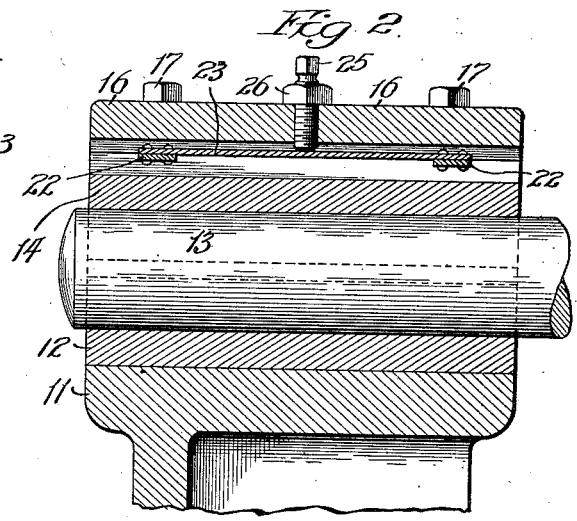
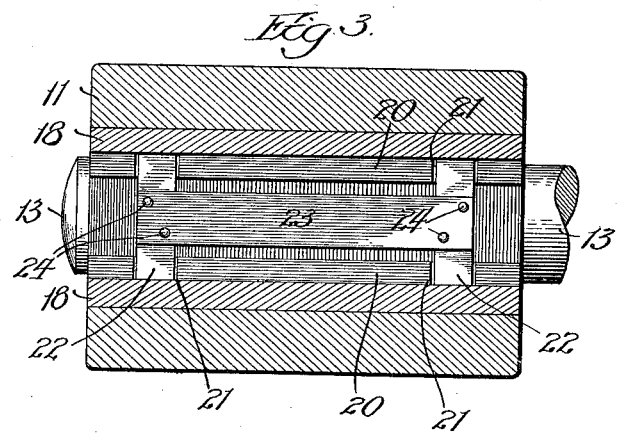
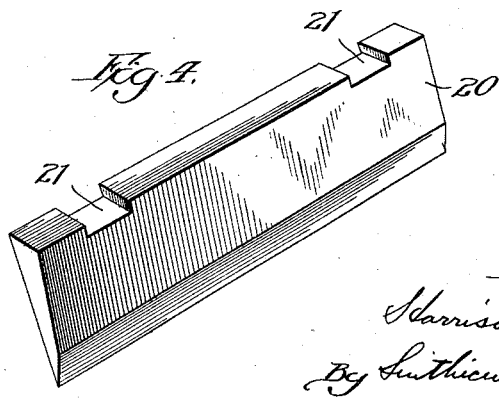

UNITED STATES PATENT OFFICE.

HARRISON J. MITCHELL, OF BELOIT, WISCONSIN, ASSIGNOR TO THE BERLIN MACHINE WORKS, OF BELOIT, WISCONSIN, A CORPORATION OF WISCONSIN.

BEARING.

1,030,912.   Specification of Letters Patent.   Patented July 2, 1912.

Application filed April 8, 1910. Serial No. 554,144.

*To all whom it may concern:*

Be it known that I, HARRISON J. MITCHELL, a citizen of the United States, residing at Beloit, in the county of Rock and State of Wisconsin, have invented certain new and useful Improvements in Bearings, of which the following is a specification.

My invention relates to an improvement in bearings, and has special reference to a form of bearing in which the journal box is retained in the position to which it is moved in a direction toward the journal.

In the ordinary form of bearing it is necessary to periodically tighten the journal box members or brasses in order to obtain the desired pressure on the rotatable journal. This necessitates constant supervision of the operator, and the wear is very apt to progress to such an extent before the boxes are properly adjusted that a loose bearing results.

It is the object of my present invention to provide means by which a desired pressure will always be obtained on the journal, at the same time automatic means preventing the box members from movement in a direction away from the journal. This result is accomplished by means of wedges which are forced into wedge-shaped grooves between one of the journal box members and an angularly disposed portion of the main bearing support. The wedges which operate within the wedge-shaped grooves are controlled by spring means, which can be given a desired tension by a bolt which passes through a part of the main bearing support. By this construction it is evident that a constant pressure of the journal members is obtained against a journal, and that on account of the special disposition of the wedges, although movement of the adjustable journal box toward the journal takes place, the action of these wedges prevents movement of the box member in a direction away from the journal. These and other advantages of my invention will be more apparent by reference to the accompanying drawings, which disclose a preferred embodiment of my device.

Figure 1 is an end elevation showing the various parts of the bearing; Fig. 2 is a vertical section on the line 2—2 of Fig. 1; Fig. 3 is a horizontal section on the line 3—3 of Fig. 1; and Fig. 4 is a perspective view of one of the controlling wedges.

As shown in the drawings, the bearing support 11 is formed with a rectangular recess which contains the lower journal box member 12, in which the journal 13 is adapted to rotate. Engaging the upper portion of the journal 13 is the journal box member 14, which has angularly disposed surfaces 15, 15 on its sides. A cap member 16 is held on the top of the bearing support 11 by means of bolts 17, 17. The cap member 16 has downwardly extending projections 18, 18, which on their vertical sides engage the sides of the main bearing support 11, and on their oblique sides 19, 19 form wedge-shaped slots with the angularly disposed sides 15 of the upper journal box member 14.

The wedges 20, 20 fit in the wedge-shaped slots which are formed between the surfaces 15 and 19. Each of the wedges 20 is provided with recesses 21, 21, and transverse members 22 extend between the two wedges 20 and have their ends engaged in the recesses 21. The two transverse members 22, 22 are connected by means of the spring 23, which is fastened to the transverse members 22, 22 by means of rivets or similar fastening devices 24. A screw 25 having the lock nut 26 passes through the cap member 16, and its end engages the spring member 23. It is evident that by adjusting the screw 25, the tension on the spring 23 may be regulated as desired.

It is important that the surfaces 15, 15 and 19, 19 should be made with the proper angles, so that when the journal box member 14 is moved toward the journal 13, the wedges 20, 20 will be moved downwardly, and when pressure is exerted on the journal 13 in an upward direction, these wedges engaging the surfaces 19, 19 will not slip over the said surfaces, but will serve to hold the journal box member 14 rigidly in the position to which it has been moved. I have found by experience that if the surface 19 is made to form an angle of approximately twenty degrees with the vertical surface of the downwardly extending projection 18, and the surface 15 is made to form an angle of approximately ten degrees with the surface 19, the desired results will be obtained; that is, the tension on the spring 23 will be effective in moving the wedges 20 downwardly so that the desired amount of pressure will be obtained on the journal 13, and at the same time if pressure is exerted in an upward direction on this journal, the wedges 20 will be firmly wedged in the slots formed between the surfaces 15, 15 and 19, 19, and no upward movement of the box member 14 can take place. Although I have specified angles of twenty and ten degrees as being most desirable, the angle between the vertical side of the projection 18 and the side 19 may be varied between fifteen and twenty-five degrees, and the angle between the surfaces 19 and 15 may be varied between eight and fifteen degrees. Under certain conditions, an even greater latitude of variation may be used.

It is evident that the bearing which is illustrated in the accompanying drawings could be exactly reversed, and the portions which are shown as being on top could be placed on the bottom of the bearing, the movable box member being below the journal 13 instead of above it. In this case the spring 23 would be located below the movable box member 14.

It will be clear from the above description that one of the fundamental features which is involved in my invention is the provision of means for retaining the journal box member in engagement with its journal at a predetermined tension, and automatically preventing the movement of the box member away from the journal.

Many changes could be made in the detailed construction of the parts which I have described without departing from the spirit of my invention.

What I claim as new and desire to cover by United States Letters Patent is:

1. In a bearing, the combination of a bearing support, a rotatable journal, a box member movable within said support, said box member having angularly disposed sides, a cap for said support, said cap having projections forming wedge-shaped slots with the angular sides of said box member, a wedge operating in each of said slots, said wedges allowing movement of said box member toward said journal and preventing movement of the box member away from said journal, and spring-controlled means for pressing said wedges toward said journal.

2. In a bearing, the combination of a bearing support, a rotatable journal, a box member movable within said support, said box member having angularly disposed sides, a cap for said support, said cap having projections forming wedge-shaped slots with the angular sides of said box member, a wedge operating in each of said slots, said wedges allowing movement of said box member toward said journal and preventing movement of the box member away from said journal, a spring for pressing said wedges in a direction toward said journal, and means for regulating the tension on said spring.

3. In a bearing, the combination of a main bearing support, a rotatable journal, a box member movable within said support, said box member having angularly disposed sides, a cap member having projections extending toward said journal, the inner surface of each of said projections forming an angle of between fifteen and twenty-five degrees with the direction of movement of said box member and forming wedge-shaped slots of an angle between eight and fifteen degrees with the sides of said movable box member, a wedge operating in each of said slots, and spring means pressing said wedges into said slots, said wedges permitting movement of said box member toward said journal and preventing movement of said box member in a direction away from said journal.

4. In a bearing, the combination of a supporting member, a cap member, a pair of projections on one of said members, a movable bearing member having a portion extending between said projections, said portion being formed to provide wedge-shaped slots between itself and said projections bounded by planes extending on opposite sides of the journal, wedges in said slots, and spring means thrusting said wedges into said slots.

5. In a bearing, a combination of a journal box comprising a supporting member and a cap member, one of said members having a pair of relatively inclined surfaces, a movable journal box member having a portion thereof lying between said surfaces and providing wedge-shaped slots between itself and said surfaces bounded by planes extending on opposite sides of the journal, wedges in said slots, and spring means thrusting said wedges into said slots.

6. In a bearing, the combination of a journal box comprising a supporting member and a cap member, one of said members having a pair of relatively diverging surfaces, a movable journal box member having a tapering portion extending into the space between said surfaces and leaving wedge shaped spaces between itself and said surfaces bounded by planes extending on opposite sides of the journal, wedges in said spaces, and means exerting a constant yielding pressure upon said wedges to force the latter into said spaces.

HARRISON J. MITCHELL.

Witnesses:
T. A. HORSTMANN,
L. A. ROSS.